(12) United States Patent
Biertuempfel et al.

(10) Patent No.: US 9,752,756 B2
(45) Date of Patent: Sep. 5, 2017

(54) LED LIGHTING DEVICE COMPATIBLE WITH NIGHT VISION DEVICES

(71) Applicant: SCHOTT AG, Mainz (DE)

(72) Inventors: Ralf Biertuempfel, Mainz-Kastel (DE); Steffen Reichel, Mehlingen (DE); Michael Landi, Hughestown, PA (US)

(73) Assignee: SCHOTT AG, Mainz (DE)

( * ) Notice: Subject to any disclaimer, the term of this patent is extended or adjusted under 35 U.S.C. 154(b) by 499 days.

(21) Appl. No.: 14/508,122

(22) Filed: Oct. 7, 2014

(65) Prior Publication Data
US 2015/0138756 A1 May 21, 2015

(30) Foreign Application Priority Data

Oct. 7, 2013 (DE) .................. 10 2013 111 081

(51) Int. Cl.

| | | |
|---|---|---|
| *G09F 13/04* | (2006.01) | |
| *F21V 9/04* | (2006.01) | |
| *B64D 43/00* | (2006.01) | |
| *B64D 47/02* | (2006.01) | |
| *F21K 9/60* | (2016.01) | |
| *F21Y 115/10* | (2016.01) | |

(52) U.S. Cl.
CPC ............. *F21V 9/04* (2013.01); *B64D 43/00* (2013.01); *B64D 47/02* (2013.01); *F21K 9/60* (2016.08); *F21Y 2115/10* (2016.08)

(58) Field of Classification Search
CPC .. F21V 9/04; F21K 9/60; B64D 43/00; B64D 47/02

USPC .......................................................... 362/97.1
See application file for complete search history.

(56) References Cited

U.S. PATENT DOCUMENTS 4,580,196 A * 4/1986 Task ................... H05B 33/0803
362/471
4,947,291 A * 8/1990 McDermott ............ F21L 4/025
359/490.02

(Continued)

FOREIGN PATENT DOCUMENTS

DE          4219740 B4     1/1993
DE      102012001141 A1    7/2013

OTHER PUBLICATIONS

Department of Defense Interface Standard MIL-STD-3009 "Lighting, Aircraft, Night Vision Imaging System (NVIS) Compatible" Feb. 2, 2001, 95 pages.

(Continued)

*Primary Examiner* — Bryon T Gyllstrom
(74) *Attorney, Agent, or Firm* — Ohlandt, Greeley, Ruggiero & Perle, L.L.P.

(57) ABSTRACT

A lighting device is provided that includes an LED and an NIR filter for a control panel or a display, which does not interfere with a night vision device. The light of the LED is in an area of u'>0.19 and v'>0.46 of the u'v' diagram of the CIE-LUV chromaticity diagram. The NIR filter exhibits descending light transmittance between 500 nm and 800 nm. The thickness of the NIR filter is chosen so that a sufficient blocking effect is provided in a range of wavelengths between 600 nm and 800 nm, so that the color coordinates of the filtered useful light are in an area with a radius of 0.04 around coordinates u'=0.19 and v'=0.49 of the u'v' diagram.

12 Claims, 12 Drawing Sheets

(56) References Cited

U.S. PATENT DOCUMENTS

| | | | | |
|---|---|---|---|---|
| 5,268,788 | A * | 12/1993 | Fox | G02B 23/12 348/801 |
| 8,876,326 | B1 * | 11/2014 | Davis | F21V 9/04 362/231 |
| 2005/0128727 | A1 * | 6/2005 | Remillard | G02B 23/12 362/1 |
| 2007/0198141 | A1 * | 8/2007 | Moore | B64D 43/00 701/3 |
| 2008/0043098 | A1 * | 2/2008 | Leblanc | F21S 8/003 348/113 |
| 2009/0225531 | A1 * | 9/2009 | Praiswater | G02B 6/0068 362/97.2 |
| 2011/0249432 | A1 * | 10/2011 | Swan | A42B 3/044 362/231 |
| 2013/0120678 | A1 * | 5/2013 | Chao | G02F 1/01 349/34 |
| 2013/0258643 | A1 * | 10/2013 | Helstern | G09F 13/04 362/97.1 |
| 2014/0328073 | A1 * | 11/2014 | Kimsey-Lin | H05B 37/02 362/470 |
| 2015/0138756 | A1 * | 5/2015 | Biertuempfel | B64D 43/00 362/97.1 |

OTHER PUBLICATIONS

German Office Action dated Jun. 30, 2014 for corresponding German Application No. 10 2013 111 081.9 with English translation, 10 pages.

* cited by examiner

LED LIGHTING DEVICE COMPATIBLE WITH NIGHT VISION DEVICES

FIELD OF THE INVENTION

The invention relates to a lighting device for illuminating a control panel or a display with light that does not interfere with the operation of a night vision device whose spectral sensitivity is in a range of wavelengths above 600 nm.

BACKGROUND OF THE INVENTION

Such a lighting device is known from U.S. Pat. No. 7,434,963 B2. Light of a first linear array of LEDs is focused by a collector lens on the one hand and by a curved mirror on the other, and is filtered by a filter that attenuates the light in a wavelength range with wavelengths of more than 550 nm. The light of the first linear array of LEDs is in a range from 575 nm to 450 nm, or from 525 nm to 425 nm, that means it is actually outside the sensitivity range of night vision devices, however any disturbing light in the cyan waveband is filtered out. Additionally, second and third linear arrays of LEDs are provided, whose light is filtered by the same filter but is focused in a different spatial angle. Further, it is described that the light emitting diodes have a band gap of at least 2 eV, and that the filter blocks electromagnetic radiation of a wavelength of more than 930 nm, or 900 nm, or 700 nm, respectively, or of a range of wavelengths between these valves and 1000 nm. U.S. Pat. No. 6,758,586 B1 relates to a lighting device that is compatible with the image reproduction system of night vision devices. The conditions under which this is possible are specified, namely; 1) the intensifier tubes should not entirely mask the pilot's visual field; and 2) the lighting equipment of the aircraft should not disturb the intensifier tubes of the night vision device by giving rise to disturbing halos or ghost images caused by reflection of illuminated objects on the windows of the cockpit. With regard to the configuration of night vision devices according to type I and type II, reference is made to the MIL-L-85762 A standard. Type I night vision devices are attached to the helmet of helicopter pilots with the screen in front of the pilot's eyes enabling him to see the control panel instruments when looking down. With type II night vision devices, the delivered images are projected on the control panel, so that the instruments and the night vision image can be viewed simultaneously. Furthermore, the risks of interference between the light sources of the aircraft and the night vision devices may further be avoided by providing the light sources in a monochromatic color that is as far away as possibly from the red wavelength band. Generation 2 and 3 type night vision devices do not have a passband limited to the infrared and have sensitivity in the red range to cover wavelengths between 600 and 770 nm. In practice, LEDs emitting green light centered at 555 nm, called the "aviation green", are used for lighting purposes. However, a drawback thereof is that the colors of the control panel are distorted, thereby reducing readability. According to the teachings of U.S. Pat. No. 6,758,568 B1, the risk of interference between the lighting sources of an aircraft and the night vision devices can be surprisingly avoided by using white light in the lighting system which is emitted from a light source working by electroluminescence. Such white light derived from diodes does not activate the automatic gain control circuit of a night vision device, and according to the teachings of U.S. Pat. No. 6,758,568 B1 it does not even need to be filtered in the critical band of red. In practice, such light sources are not found. Many light sources emit far less than 1% of red light of a wavelength of greater than 650 nm. In fact this is very little, but due to the high gain of image intensifiers even an imperceptible glow of dark red light is unacceptable. The imperceptible glow of an image intensifier are described in the MIL-STD-3009 standard, for example.

In practice, however, the user might desire to use LEDs that emit critical light in the red range above 620 nm.

DE 42 19 740 B4 discloses a display device which comprises a display including LEDs and a filter arrangement including a dichroic filter, an infrared stop filer, and a circularly polarized filter, for use in conjunction with a night vision device. The LEDs emit green light from about 510 nm to 720 nm, with an emission peak at 570 nm. The filter arrangement attenuates the radiation in a range between about 620 nm and 720 nm.

From DE 10 2012 001 151 A1 a lighting device is known which produces mixed light using a white LED, a green LED, and a red LED, which mixed light is filtered by an optical filter means to block light of a cutoff wavelength greater than 610 nm. For this purpose, a so-called NVIS film or an interference filter means is used.

US standard MIL-STD-3009 includes qualitative specifications on the spectral sensitivity of different classes of night vision devices. From the requirement profile follows that edge filters which are available as interference filters should be used to block a certain red part of the spectrum of the illumination light.

The technical description of the color of a light is internationally standardized according to the CIE standard (see CIE web site). For NVIS compatible light sources, the CIE Universal Color Standard (UCS) of 1976 has been adopted in which the color location is specified by coordinates u' and v'. An illustration of the CIE-LUV color space system can be found in Wikipedia where the normalized values u' and v' are explained, which define a chromaticity diagram according to CIE 1976 UCS.

One requirement on any lighting device is that the light has the desired spectral color. In conjunction with night vision devices, the lighting device must additionally have a specific "NVIS radiance" which is defined as the ratio of near infrared radiation to visible radiation. In order to satisfy both requirements, a near infrared absorbing filter is used which additionally absorbs a certain amount of long-wavelength red light. For ordinary light sources, such as incandescent lamps and white LEDs, this means a considerable spectral color change of the light source. For incandescent lamps whose light can be described by the color temperature it is rather easy to determine a suitable filter that makes the light source compatible with night vision devices. However, this does not apply to LEDs. LEDs of the same color temperature do not necessarily have the same color coordinates in the u'v' diagram of the CIE-LUV color space system.

SUMMARY OF THE INVENTION

The invention is based on the object to provide a lighting device with light that does not interfere with the operation of a night vision device, does not create any ghost images, can be made small in size, and can be manufactured cost-efficiently.

This object is achieved by the subject matter of the independent claims.

Specifically, four steps are proposed so achieve the desired object:

1) choosing a suitable filter glass as specified in the present invention;
2) choosing an LED as specified in the present invention;
3) calculating the minimum thickness of the filter glass, so that sufficient radiation is absorbed in the NIR; (this calculation is performed according to the MIL-STD-3009 or RTCA DO-275 standards, for example);
4) checking/increasing the filter glass thickness to have the color location of the LED-filter combination in the desired tolerance range (the calculation of the color location is made according to the specifications of CIE No. 15 (2004) Technical Report Colorimetry ISBN 3901 906 339).

For the filter, an absorbing filter glass is selected that has a largely direction-independent filtering effect. Such filters are volume filters whose color intensity or filter effect is a function of the thickness. (Filters based on interference layers are strongly dependent in their filter effect on the direction of the incident radiation, but independent of the thickness.)

Specifically, one or more LEDs are used as the primary light source, with a color location that can be represented by coordinates in the u'v' diagram of the CIO-LUV color space system which are on or near the black body line of this diagram. By virtue of the NIR filter, the filtered light is shifted into an area which is still in a tolerated white region of the u'v' diagram. Such NVIS white areas are specified in the standards MIL-STD3009 and RTCA DO-275. To this end, an NIR filter corresponding to one of the filters described in Table 1 is selected. These filters are defined in Table 1 through their spectral diabatie. For illustration: The lower transmission limits of 1% are at about 330 nm and 650 nm when a useful thickness has been chosen. At the critical wavelength of 600 nm, these filters exhibit a transmittance of about 32% in the useful thickness, so they can be referred to as well transmitting between 350 and 600 nm.

LEDs with two local intensity maxima are preferred. The first local intensity maximum is between 410 nm and 460 nm and thus in the blue region of the spectrum, while the second local intensity maximum is at 565 nm and thus in the green region. When the wavelength is represented linearly on the abscissa, the first intensity maximum is narrow as compared to the second intensity maximum. The ratio of the heights of the maxima is in a range from 0.6 to 1.6, that means the narrow maximum in the blue region of the spectrum may be smaller than, equal to or greater than the wide maximum in the green region.

The LEDs that can be used are commonly referred to as "warm white". Their color coordinates in the u'v' diagram of the CIE-LUV color pace system should be in a range of u'>0.19 and v'>0.46.

According to a preferred embodiment of the invention, an optical glass with a content of phosphorus and copper is used as the NIR filter. Examples of such optical filter glasses are the types BG39, S8612, and BG55 of Schott AG. It is also possible to use an optical filter glass with a fluorine content, e.g. types BG60, BG61, BG62, VG20, of SCHOTT AG.

The NIR filter absorbs a substantial portion of the red spectrum, so that this spectral component will not disturb the operation of the night vision device. The disturbing spectral component is absorbed. This is an advantage over an interference filter which reflects the spectral portion to be filtered out and therefore involves a risk of ghost images and disturbing reflections.

For a good efficiency of the filter the useful radiation should not be reflected if possible, and to that end the filter may be coated with an anti-reflective layer that is optimized in regions between 400 nm and 600 nm.

Depending en the circumstances, the optimum range of the anti-reflective layer may be between 420 and 600 nm, or between 430 and 600 nm, or between 440 and 600 nm.

BRIEF DESCRIPTION OF THE DRAWINGS

Further details of the invention will become apparent from the exemplary embodiments described in conjunction with the drawings and the claims. In the drawings:

Figure 1:
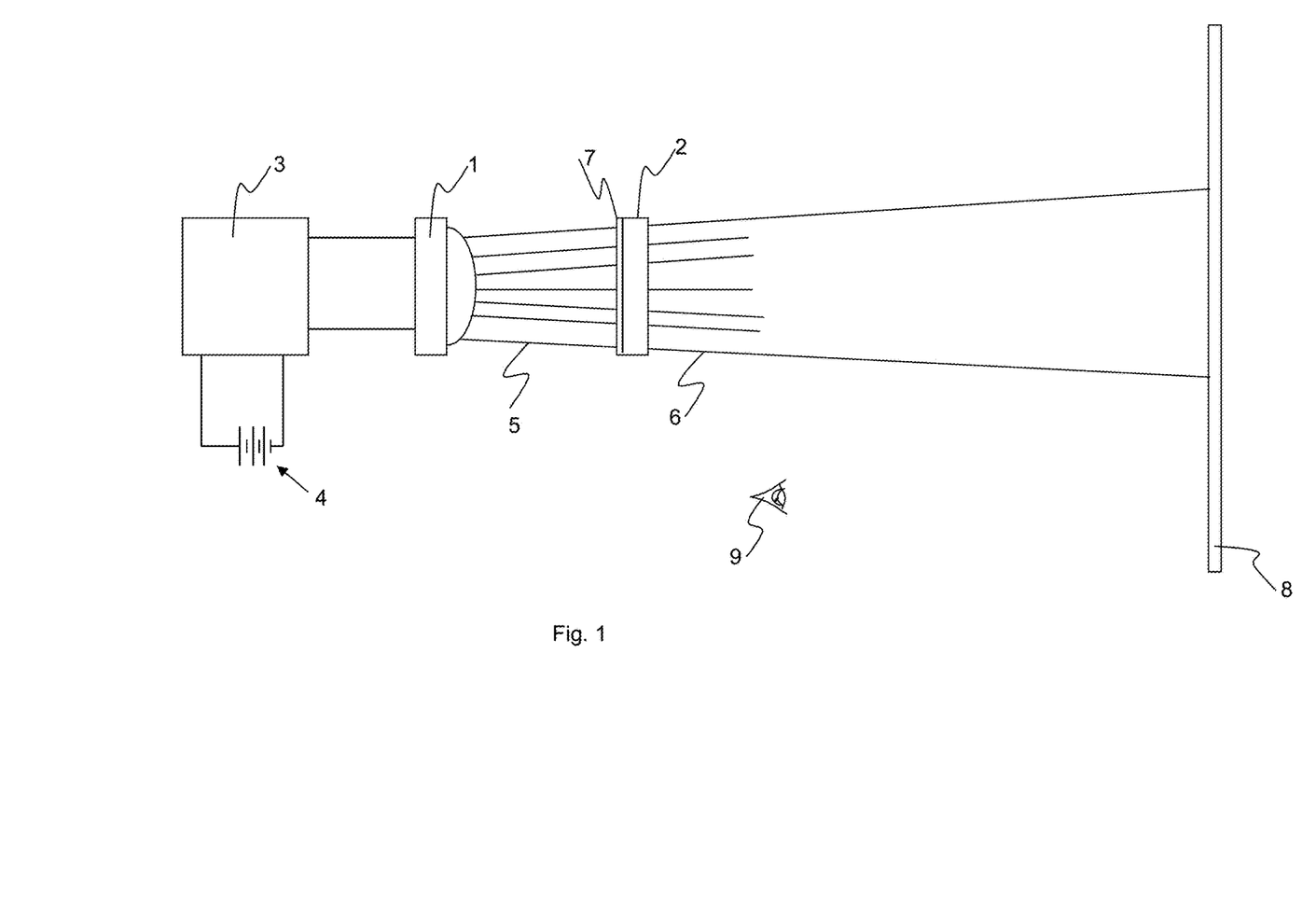
FIG. 1 illustrates the configuration of a first lighting device.
Figure 3:
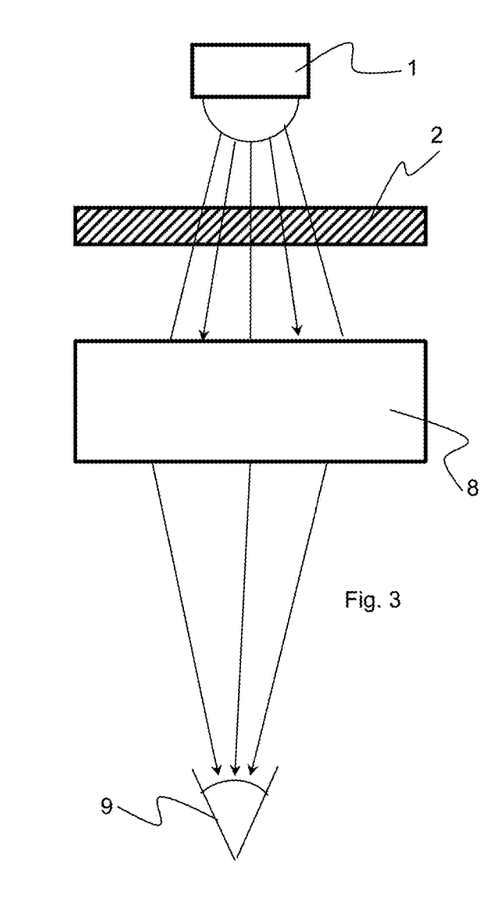
FIG. 3 schematically illustrates a third lighting device.
Figure 5:
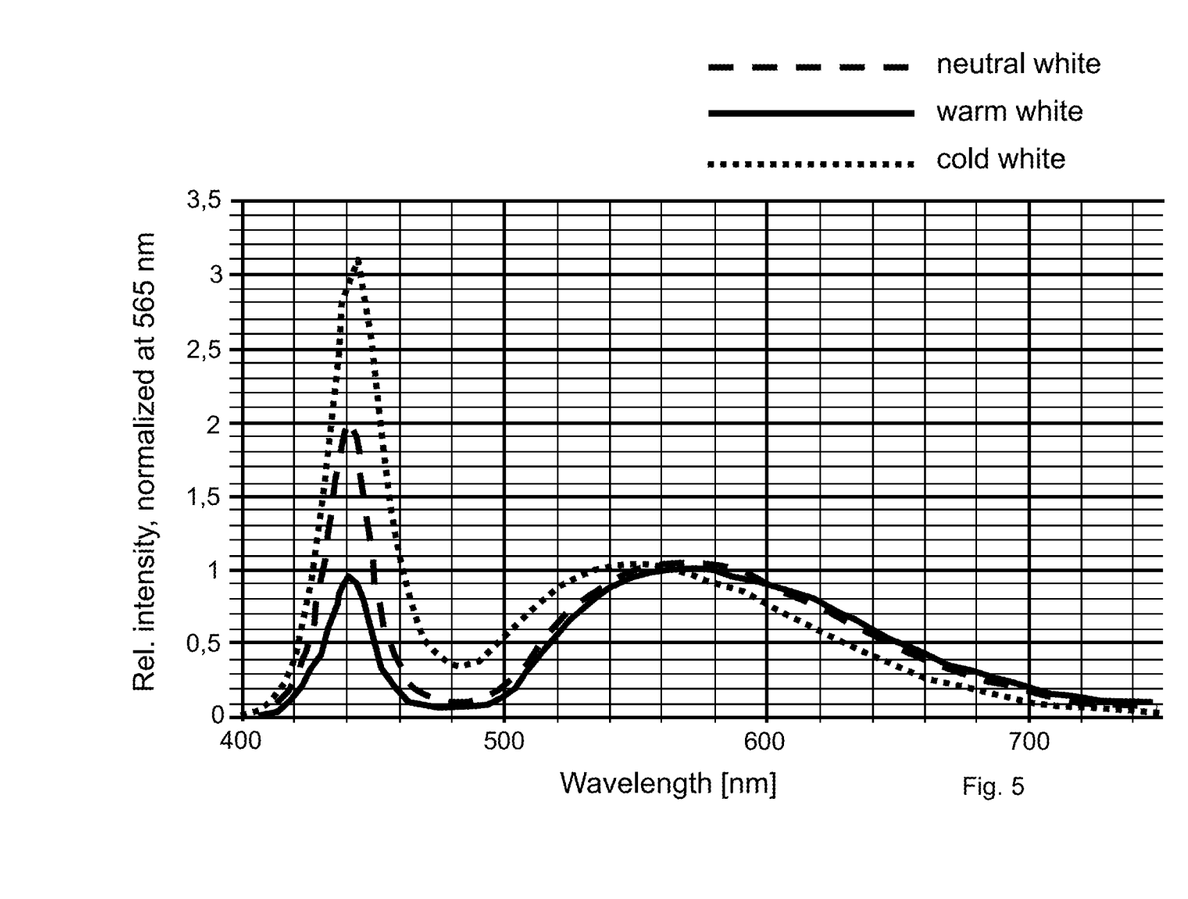
FIG. 5 is a spectral diagram of LEDs as a function of light wavelength.

FIG. 1 schematically shows a lighting device comprising an LED 1 and a filter 2. LED 1 is supplied with power from a power source 4 via a control device 3 in a manner so that the emitted light 5 has a well-defined spectral composition as illustrated in FIG. 5. Spectral components predominantly in the visible range of up to 600 nm are transmitted by the filter 2 to be fed to a display panel 8 as useful light 6. In the exemplary embodiment of FIG. 1, an observer 9 and the lighting device 1, 2, 3 are on the same side as the display panel with respect to the frontal illumination; but it is also possible to arrange backlighting including the lighting device behind the display panel, as shown in FIG. 3. The observer may be an image intensifier.

Figure 2:
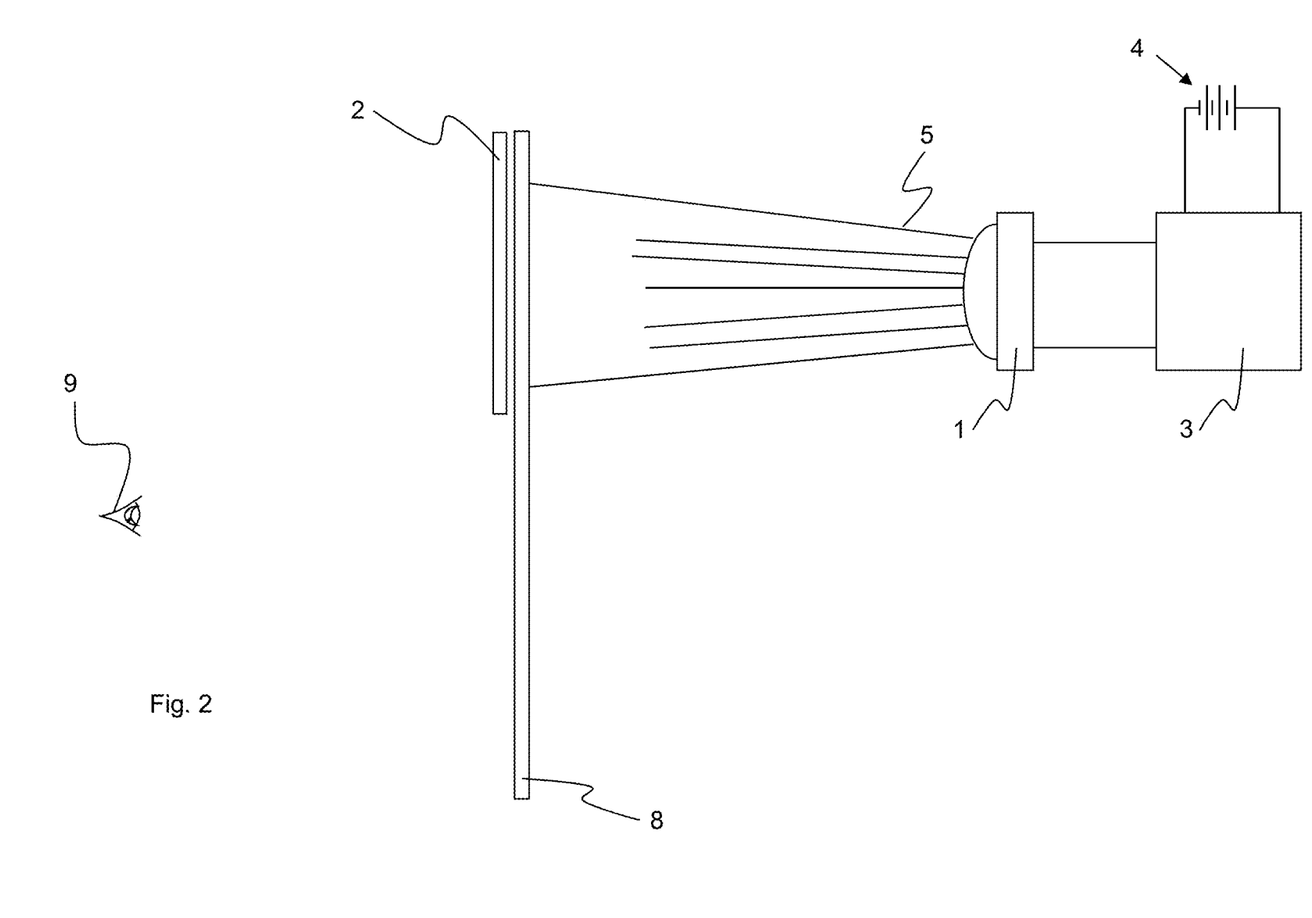
FIG. 2 illustrates the configuration of a second lighting device.
Figure 4:
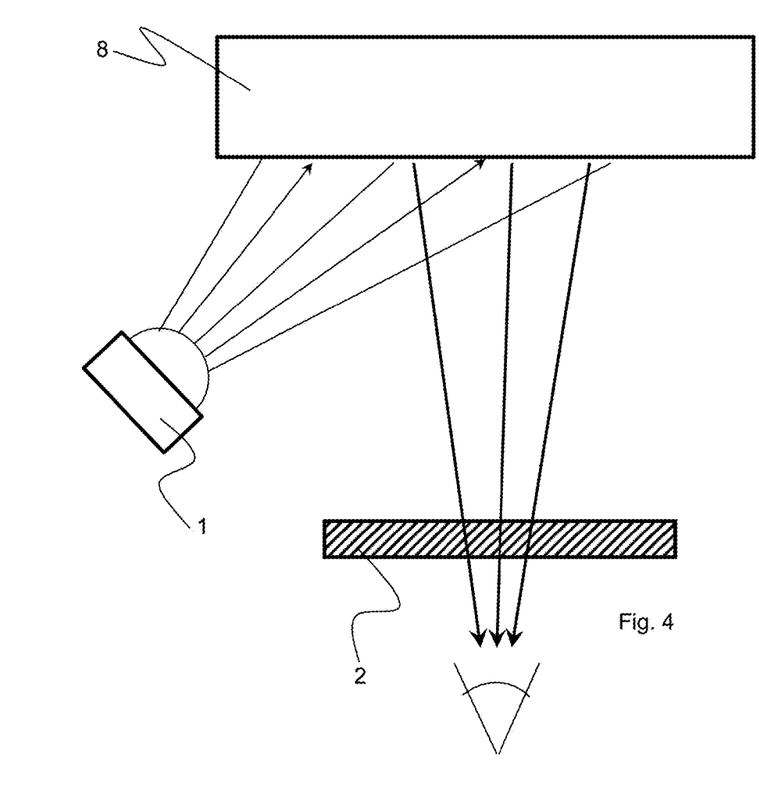
FIG. 4 schematically illustrates a fourth lighting device.

In FIG. 2, the light 5 from the LED is used for backlighting the display panel 8, and the filter 2 is arranged in front of the display panel, so that the observer 9 vies the display through the filter. Here, again, frontal lighting of the display panel 8 would be possible, as shown in FIG. 4.

Thus, either the light 5 illuminating the display is filtered, or the light emitted from the display is filtered. In both cases the observed radiation is a result of the spectral components of the lighting device and the spectral alteration due to the filter and the display. The influence of the display on the color location or NIR absorption has to be considered. The calculation is similar to that for a filter. However, the spectral characteristics of the display panel are non-varying and the design of the entire system including the filter and the display panel is made by varying only the lighting and the filters. Therefore, without limiting generality, the spectral alteration attributable to the display will no further be discussed below.

For better light efficiency, in a preferred embodiment the filter 2 has one or two (front and rear surface) anti-reflective layers 7 which are optimized for the useful light 6.

Figure 6:
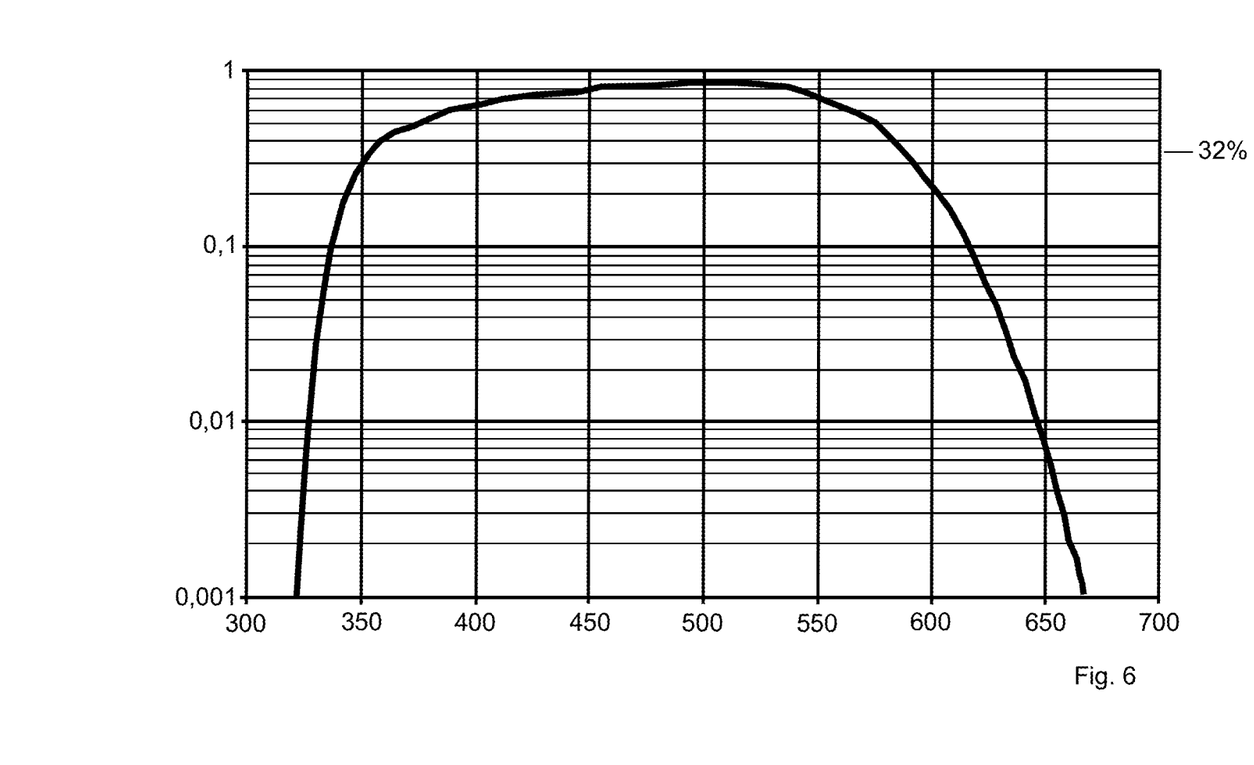
FIG. 6 shows the transmission characteristic of an NIR filter as a function of light wavelength.

The spectral region of white light includes cold white, neutral white, and warm white, with more blue components in the cold white and more red components in the warm white. Filter 2 and anti-reflective layer 7 have an influence on the white nature of the useful light 6. When assuming a filter 2 having a transmission characteristics as shown in FIG. 6, the white nature or the useful light 6 can be influenced by a suitable choice of the anti-reflective layer 7. For cold spectral white, the anti-reflective layer is optimized for a passband between 400 nm and 600 nm. For white light with a faint blue character, the anti-reflective layer 7 is optimized for a passband between 420 nm and 600 nm. Neutral white is obtained with an anti-reflective layer which is optimized between 430 nm and 600 nm. Finally, warm white can be achieved with an anti-reflective layer 7 which is optimized between 440 and 600 nm.

FIG. 5 shows the light intensity as a function of the wavelength of LED light for cold spectral white, for neutral spectral white, and for warm spectral white. The light intensity is normalized at 565 nm. The spectra of most white LEDs have two local maxima: (1) a red maximum between 530 nm and 630 nm, and (2) a blue maximum between 410 nm and 640 nm. As can be seen from the illustration in FIG. 5, the light of a cold white light LED has more blue light components than a warm-light LED. While FIG. 5 shows a typical distribution of light intensity of LEDs, there are thousands of different shades of LEDs on the market, and all of them are called "white LEDs".

Figure 7:
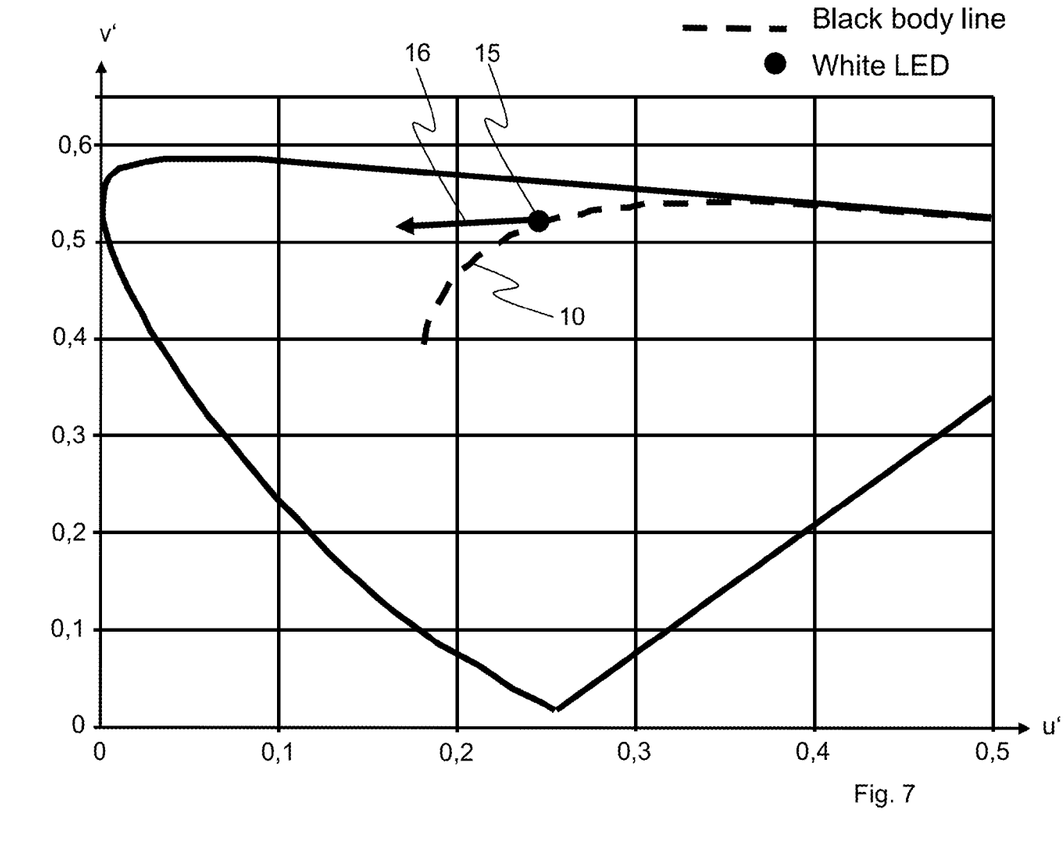
FIG. 7 shows the u'v' diagram of the CIE-LUV color space system.
Figure 8:
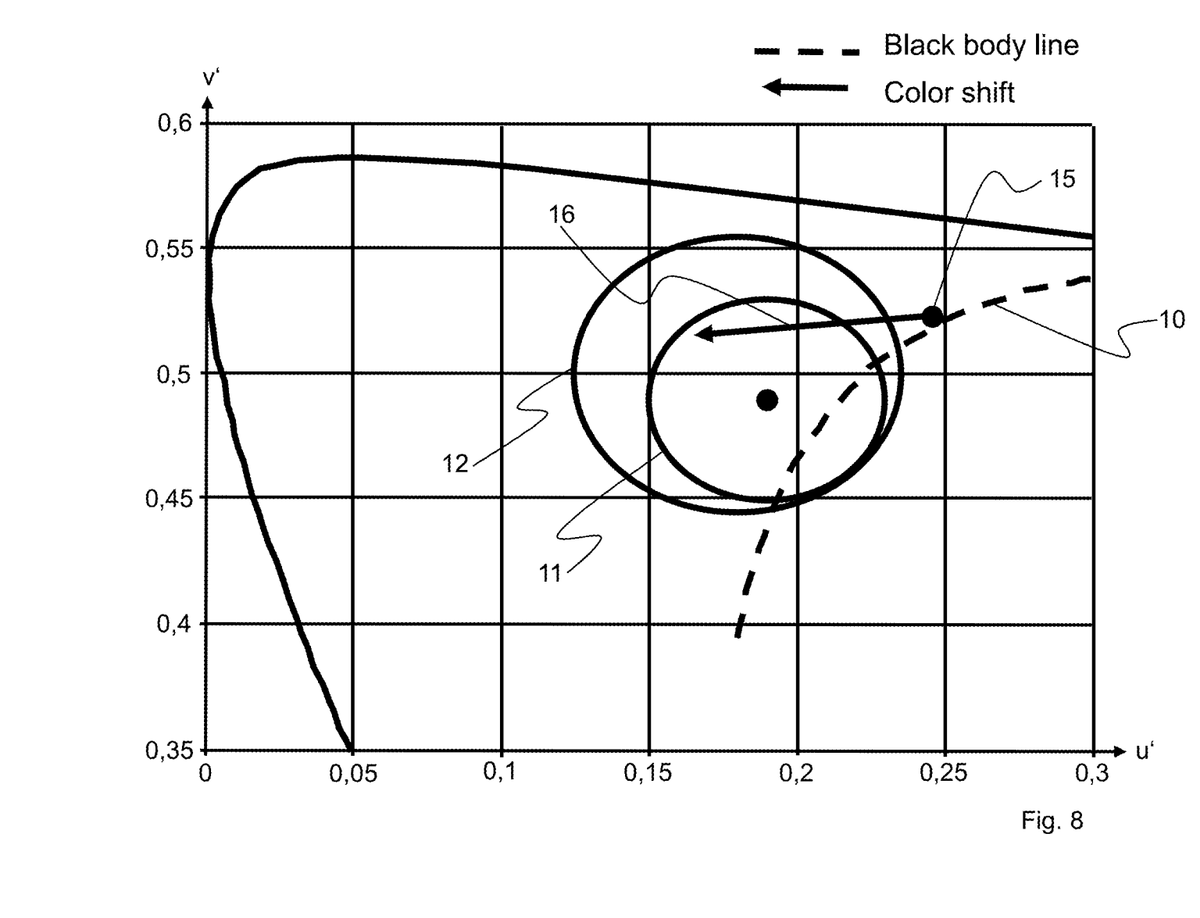
FIG. 8 shows a detail of the color spectrum diagram, with white areas indicated.

FIG. 7 is a u'v' diagram of the CIE-LUV color system with a black body line 10 indicated therein, and FIG. 8 shows an enlarged detail of FIG. 7, with indicated areas 11, 12 of spectral white. For the purposes of the invention, an LED with a color location on or near the black body line 10 is chosen, so that by means of filter 2 useful light within the white regions 11 and 12 of FIG. 8 can be obtained. Such a color location 15 of a suitable LED is indicated in FIGS. 7 and 8. By the effect of filter 2 the color location is shifted towards blue, as indicated by arrow 16. White area 11 is defined by a circle with a radius of 0.04 around coordinates u'=0.19 and v'=0.49. White area 12 has a radius of 0.055 around coordinates u'=0.18 and v'=0.5. In order to arrive in white area 11 or 12 by virtue of the filter effect of filter 2, the color location 15 of the LED in the u'v' diagram should be in a range defined by u'>0.19 and v'>0.46 when it is intended to reach white area 11, and should be in a range defined by u'>0.18 and v'>0.45 when it is intended to ensure that the white area 12 is reached.

Although other LEDs than those illustrated in FIG. 5 are likewise useful for the purposes of the invention, white LEDs with two local maxima are preferred. The first local intensity maximum is between 410 nm and 460 nm. The second local intensity maximum is at about 565 nm (±10 nm). The two maxima can have the same or different heights. The ratio of the maximum intensities ranges from 0.6 to 1.6.

Lighting devices are often equipped, with an optical system for guiding the light, and so it makes sense to use optical glass with the necessary properties of a filter material. Especially the optical filter glasses BG39, BG55, S8612, BG60, BG61, BG62, and VG20 from Schott AG are suitable as NIR filters for filtering light in the near infrared region. The properties of other suitable optical filter glasses can be seen from FIGS. 10 to 14.

In terms of transmission characteristics, these optical filter glasses have a steep edge at short wavelengths in a range from 300 to 400 nm, and a less steep curve section at longer wavelengths in a range from 500 to 800 nm. Therefore, for the purposes of an interference-free lighting device for night vision devices, interference filters with a steep edge in a range from 580 to 630 nm were preferred over optical filter glasses (see MIL-STD-3009, FIG. 1 and FIGS. C-4, C-5, C-6). However, the blocking effect of optical filter glasses can be adjusted through the glass thickness, and it is adapted to the spectral profile of the primary white light source 1 in such a manner that unwanted spectral components of the useful light in a wavelength range above 600 nm are sufficiently attenuated by absorption.

The internal transmittance $\tau_i$ of a filter is defined as a function of thickness d and absorption coefficient $\alpha$ by the exponential law as follows:

$$\tau_i = e^{-\alpha d}$$

Since the transmission properties of an absorbing filter are dependent on the thickness thereof, the description of spectral diabatie has been established in the art. The spectral diabatie profile is capable to very well reflect the spectral character of an absorption filter, since a change in thickness of the filter material is only expressed in a shift of the curve in parallel to the y-axis. In this way, different filter materials can be compared, and the effectiveness of a filter, namely the ratio of a high absorbance to a high transmittance can be described independently of the thickness.

Therefore, the spectral transmission properties will be described below by spectral diabatie. Spectral diabatie is defined as follows:

$$\theta(\lambda) = 1 - \log\left(\log\frac{1}{\tau_i(\lambda)}\right) + c$$

Here, $\tau_i$ is the internal transmittance which is a function of wavelength $\lambda$ and the selected reference thickness of the glass. The constant c merely represents a shift that results when the glass is used in a thickness different from the reference thickness. In this way the glasses can be defined in general terms, because the spectral profile of diabatie is independent of the actual glass thickness; instead there is only a shift in the vertical axis resulting.

The thickness of the glasses must be selected so that the specification of NVIS radiance is met (see e.g. the STD-MIL-3009 standard).

Particularly suitable glasses which in combination with the right LED give a NVIS-compatible lighting device are shown in Table 1. These glasses exhibit sufficient absorption in the NIR and yet very high transmittance in the visible range.

The common characteristic of these glasses which are suitable for the invention is that the profile of spectral diabatie is sufficiently steep between 600 nm and 800 nm to meet the requirements of the MIL-STD-3009 and RTCA DO-275 standards. Between 700 nm and 800 nm, the glasses must have a minimal difference in diabatie of:

$$\theta(700 \text{ nm}) - \theta(800 \text{ nm}) \geq 0.25$$

Between 600 nm and 800 nm, the difference in diabatie must be at least as follows:

$$\theta(600 \text{ nm}) - \theta(800 \text{ nm}) \geq 0.9$$

TABLE 1

The spectral diabatie values for a suitable thickness are given for different types of glass. Glasses 1 through 7 are experimental melts; glasses BG39, BG60, and VG20 are commercially available catalog glasses.

| Wavelength | Glass 1 | Glass 2 | Glass 3 | Glass 4 | Glass 5 | Glass 6 | Glass 7 | Glass BG60 | Glass BG39 | Glass VG20 |
|---|---|---|---|---|---|---|---|---|---|---|
| 350 | 0.969 | 0.958 | 0.969 | 0.996 | 0.962 | 0.979 | 1.014 | 1.079 | 1.422 | 0.987 |
| 400 | 1.601 | 1.587 | 1.610 | 1.674 | 1.561 | 1.625 | 1.678 | 1.782 | 1.907 | 1.576 |
| 450 | 1.872 | 1.863 | 1.880 | 1.940 | 1.798 | 1.844 | 1.964 | 2.071 | 2.262 | 1.857 |
| 500 | 2.066 | 2.062 | 1.990 | 1.990 | 1.795 | 1.743 | 2.160 | 2.256 | 2.583 | 2.076 |
| 525 | 2.004 | 2.005 | 1.897 | 1.871 | 1.704 | 1.626 | 2.071 | 2.133 | 2.484 | 2.032 |
| 550 | 1.763 | 1.761 | 1.689 | 1.670 | 1.557 | 1.496 | 1.788 | 1.814 | 2.107 | 1.789 |
| 600 | 1.143 | 1.137 | 1.113 | 1.109 | 1.062 | 1.033 | 1.142 | 1.146 | 1.318 | 1.153 |
| 650 | 0.690 | 0.681 | 0.673 | 0.676 | 0.660 | 0.652 | 0.681 | 0.690 | 0.771 | 0.694 |
| 700 | 0.396 | 0.386 | 0.390 | 0.396 | 0.389 | 0.387 | 0.394 | 0.394 | 0.398 | 0.394 |
| 750 | 0.221 | 0.210 | 0.206 | 0.211 | 0.204 | 0.203 | 0.209 | 0.224 | 0.158 | 0.215 |
| 800 | 0.137 | 0.124 | 0.116 | 0.121 | 0.113 | 0.112 | 0.120 | 0.136 | 0.025 | 0.127 |
| 850 | 0.111 | 0.099 | 0.093 | 0.096 | 0.137 | 0.096 | 0.097 | 0.111 | 0.000 | 0.102 |
| 900 | 0.120 | 0.101 | 0.104 | 0.113 | 0.137 | 0.096 | 0.101 | 0.126 | 0.000 | 0.113 |
| 950 | 0.169 | 0.155 | 0.153 | 0.147 | 0.160 | 0.148 | 0.156 | 0.167 | 0.000 | 0.155 |

Figure 9:
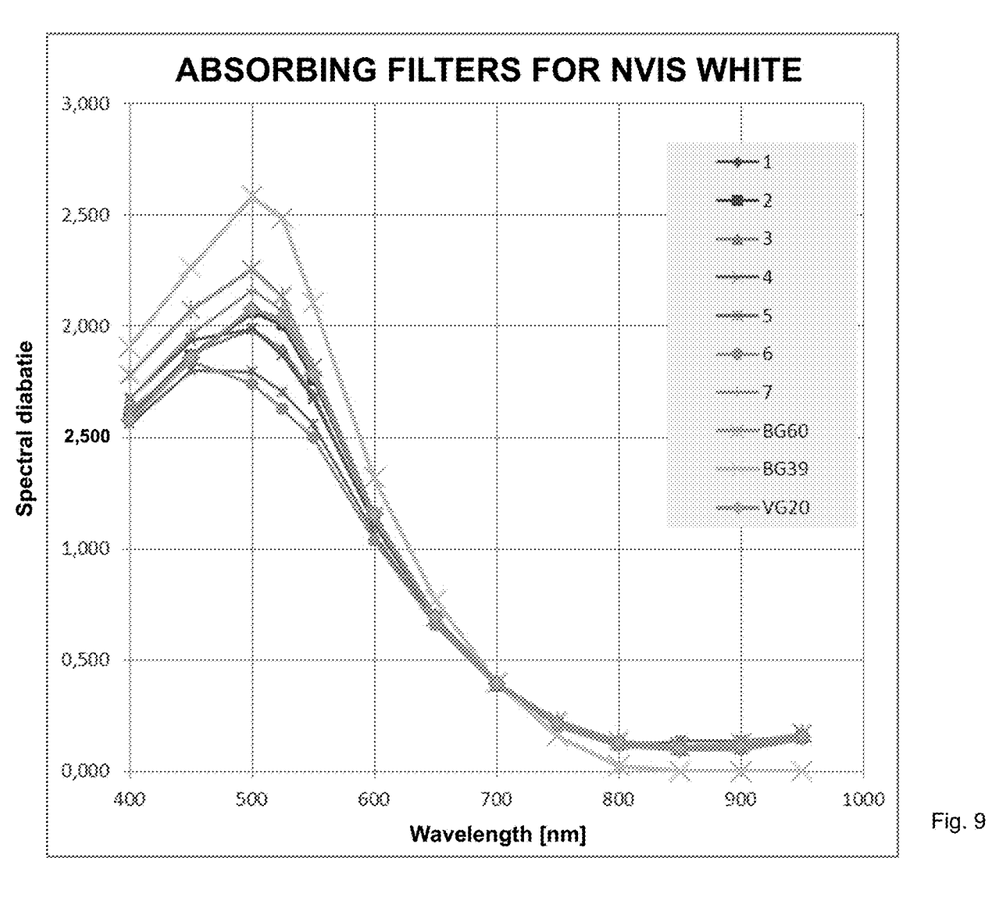
FIG. 9 shows spectral diabatie characteristics of selected glasses.
Figure 10:
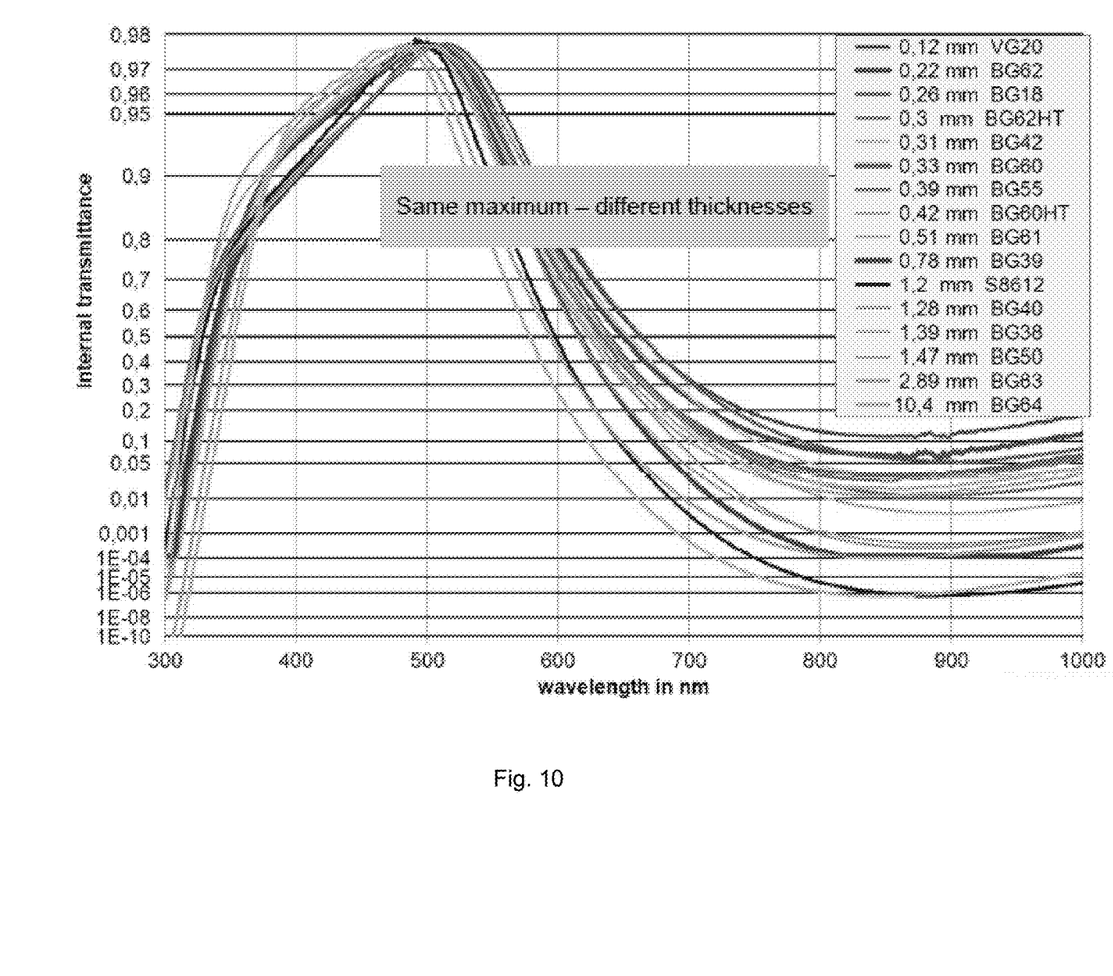
FIG. 10 shows light transmittance of Schott filter glasses of different thicknesses as a function of light wavelength for a same maximum at 500 nm.
Figure 11:
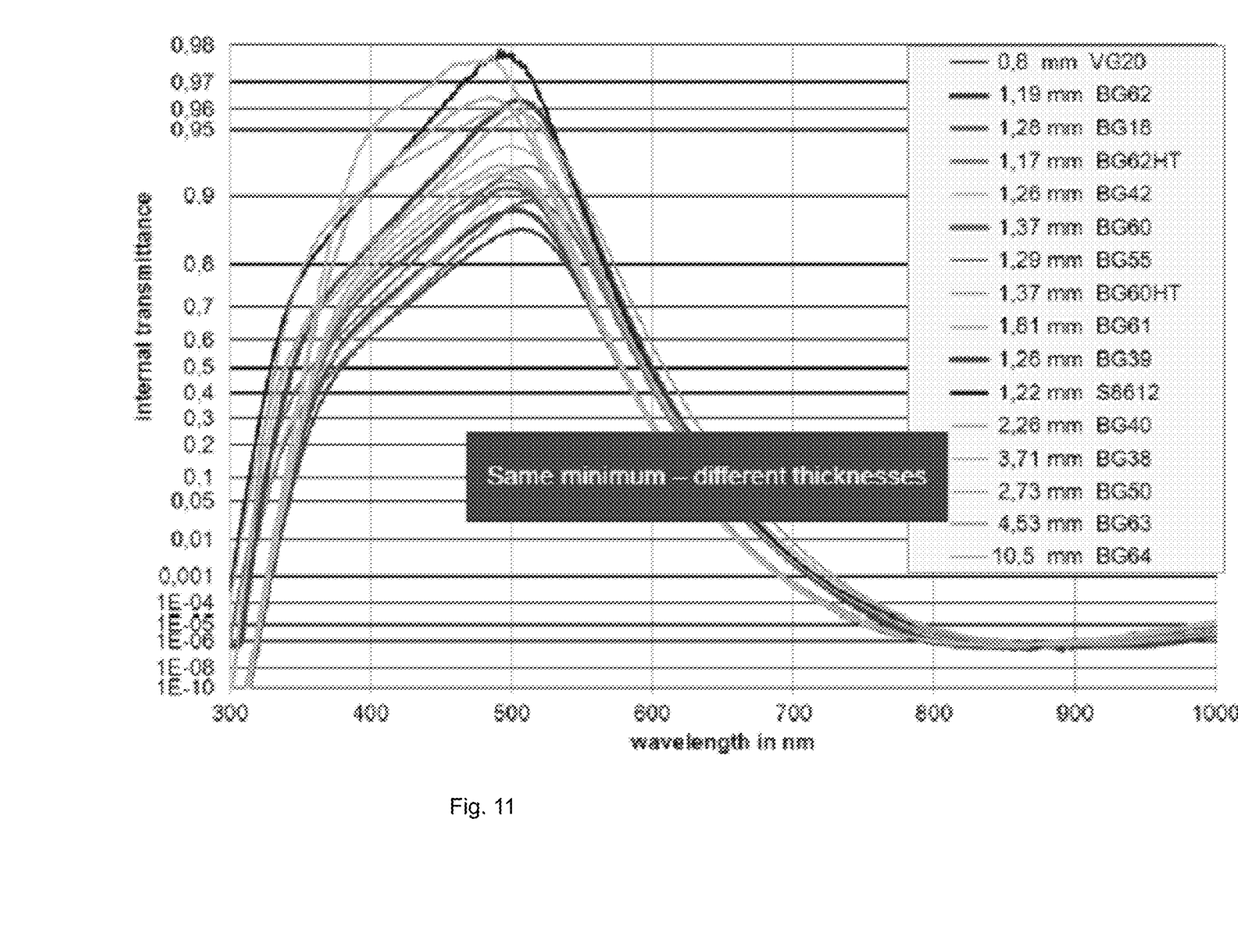
FIG. 11 shows light transmittance of Schott filter glasses of different thicknesses as a function of light wavelength for a same minimum at 880 nm.
Figure 12:
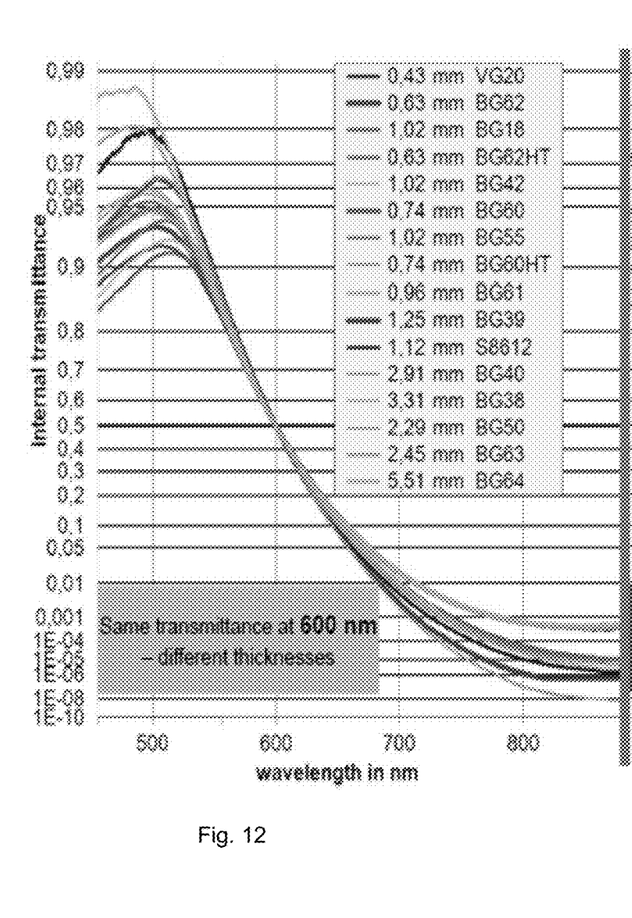
FIG. 12 shows light transmittance of Schott filter glasses of different thickness as a function of light wavelength for the same light transmittance of 0.5 at 600 nm.
Figure 13:
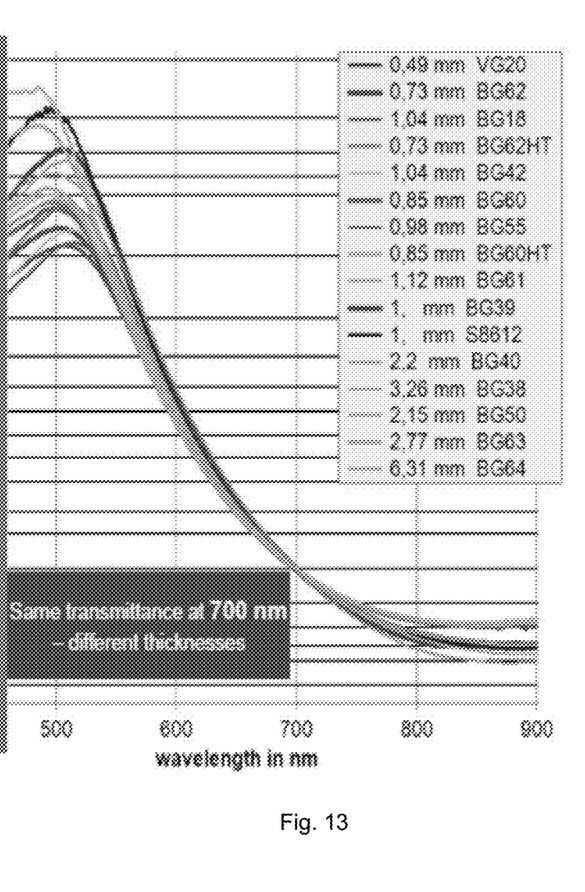
FIG. 13 shows light transmittance of Schott filter glasses of different thicknesses as a function of light wavelength for the same light transmittance of 0.01 at 700 nm.
Figure 14:
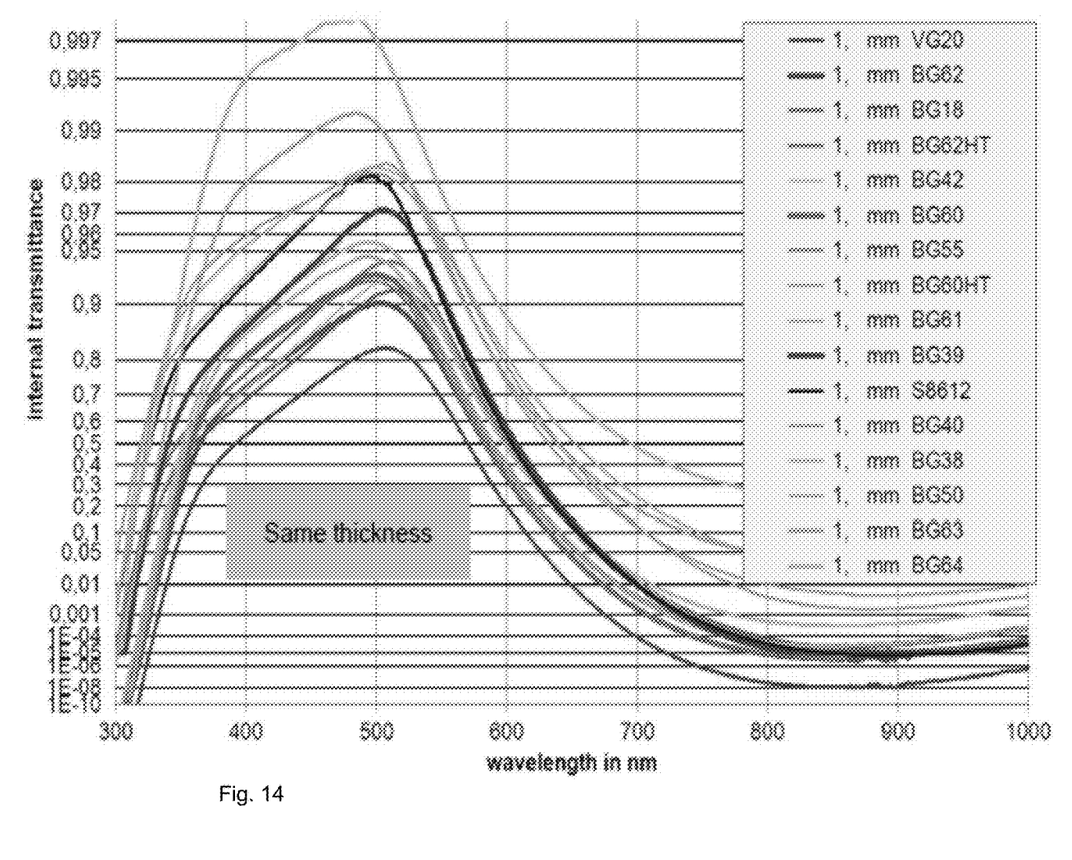
FIG. 14 shows light transmittance of Schott filter glasses as a function of light wavelength for the same thickness.

FIG. 9 shows characteristics of spectral diabatie for the glasses from Table 1. The thicknesses have been chosen so that at 700 nm the same diabatie value results. In this manner the glasses can be better compared graphically: So it is apparent that at 700 nm glass BG39 has the steepest slope of internal transmittance/diabatie of all glasses.

The luminous efficacy or brightness of a display in the wavelength range is greater when the filter has a higher transmittance at 500 nm. Thus, the energy efficiency of the display increases. This is advantageous but not absolutely necessary in order to comply with the standards MIL STD-3009 and RTCA DO-275. For the present application, the glasses which ensure maximum light output in the visible range are particularly advantageous. These are glasses whose diabatie difference between 500 nm and 800 nm reached a value of greater than:

$$\theta(500 \text{ nm}) - \theta(800 \text{ nm}) \geq 1.5.$$

Also important is the spectral distribution of the transmission properties: at wavelength of greater than 651 nm, absorptivity should be as high as at least 97.7%, that means, transmittance should be less than 2.3%.

Filters made of optical glass including a content of phosphorus and copper and/or including a content of fluorine are particularly useful for the filter purposes according to the invention.

EXAMPLES

1. BG39 with LED
BG39 is chosen in a thickness of 2 mm and is used with the LED types "Luxeon S4-TP-K" or "NSSW100C" or "Rebel LXML-PWN1-0080" or "SEOL pure white".
This combination results in a color location that is compatible with the definition of "NVIS white" according to MIL-STD-3009.

2. BG60 with LED
BG60 is chosen in a thickness of 1.6 mm and is used with one of the LEDs from the following list: LUXEON A2-RM-G; LUXEON T2-SO-L; LUXEON B5-R0-G; LUXEON Q1-RM-K; CreeNW370; SEOUL_natural white.
This combination results in a color location that is compatible with the definition of "NVIS white" according to MIL-STD-3009.

The invention provides a lighting device including LED (1) and NR filter (2) for a control panel or a display (8, that does not interfere with a night vision device (9). The light from the LED (1) is at u'>0.19 and v'>0.46 of the u'v' diagram of the CIE-LUV color space diagram. The NIR filter (2) has spectral diabatie values for wavelengths at 800 nm, 700 nm, and 600 nm which give a diabatie difference of at least 0.25 between 800 nm and 700 nm and of at least 0.9 between 800 nm and 600 nm. The color coordinates of the filtered light are in an area with a radius of 0.04 around coordinates u'=0.19 and v'=0.49 of the u'v' diagram.

The invention claimed is:

1. A lighting device for illuminating a control panel or a display with light that does not interfere with operation of a night vision device whose spectral sensitivity is in a range of wavelengths above 600 nm, comprising:
   a primary light source in form of one or more white LEDs whose emitted light is in an area of the u'v' diagram of the CIE-LUV color space system above u'>0.19 and v'>0.46; and
   an NIR filter in the near infrared comprising an absorbing filter glass in form of a volume filter having a descending light transmission characteristic between 500 nm and 800 nm and having a thickness that provides for a sufficient blocking effect in a range of wavelengths between 600 nm and 800 nm so that the NIR filter and the one or more white LED's produce filtered light whose color coordinates are in an area with a radius of 0.04 around coordinates u'=0.19 and v'=0.49 of the u'v' diagram of the CIE-LUV color space system.

2. The lighting device as claimed in claim 1, wherein the light of the one or more white LED's has color coordinates in the u'v' diagram of the CIE LUV color space system of u'>0.18 and v'>0.45, and with filtered light whose color coordinates are in an area with a radius of 0.055 around coordinates u'=0.18 and v'=0.5 of the CIE LUV color space system.

3. The lighting device as claimed in claim 1, wherein the absorbing filter glass is an optical glass with a content of phosphorus and copper.

4. The lighting device as claimed in claim 1, wherein the absorbing filter glass is an optical glass with a content of fluorine.

5. The lighting device as claimed in claim 1, wherein the one or more white LED's is of a type having two local intensity maxima, with a first local intensity maximum between 410 nm and 460 nm, and a second local intensity maximum at 565 nm, and with a ratio of the first and second local maximum intensities in a range from 0.6 to 1.6.

6. The lighting device as claimed in claim 1, wherein the absorbing filter glass has at least a difference in spectral diabatie values of $\theta(700 \text{ nm}) - \theta(800 \text{ nm}) \geq 0.25$ between 700 nm and 800 nm.

7. The lighting device as claimed in claim 6, wherein, for 600 nm and 800 nm, the difference in spectral diabatie is $\theta(600 \text{ nm}) - \theta(800 \text{ nm}) \geq 0.9$.

8. The lighting device as claimed in claim 6, wherein, for 500 nm and 800 nm, the difference in spectral diabatie is $\theta(500 \text{ nm}) - \theta(800 \text{ nm}) \geq 1.5$.

9. The lighting device as claimed in claim 1, wherein the NIR filter exhibits an absorptivity of at least 97.7% for wavelengths of more than 651 nm.

10. The lighting device as claimed in claim 1, wherein the NIR filter is provided with at least one anti-reflective layer which is optimized for a range between 400 nm and 600 nm.

11. The lighting device as claimed in claim 1, wherein the NIR filter is arranged between the primary light source and the control panel or display.

12. The lighting device as claimed in claim 1, wherein the NIR filter is arranged between an observer and the control panel or a display.

* * * * *